Dec. 12, 1939.    F. F. RIDLEY    2,183,281
APPARATUS FOR PNEUMATIC SEPARATION OF MATERIALS OF
DIFFERENT SPECIFIC GRAVITIES AND SIZES
Filed May 21, 1937
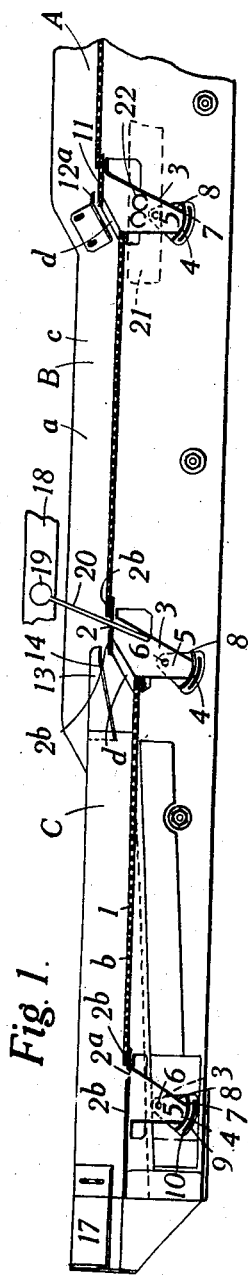
INVENTOR
Frank F. Ridley
BY
Sommers & Young
ATTORNEYS Patented Dec. 12, 1939

2,183,281

UNITED STATES PATENT OFFICE 2,183,281

APPARATUS FOR PNEUMATIC SEPARATION OF MATERIALS OF DIFFERENT SPECIFIC GRAVITIES AND SIZES

Frank Frost Ridley, Sheffield, England, assignor to Colliery Engineering Limited, Sheffield, England, a British joint-stock company Application May 21, 1937, Serial No. 144,047
In Great Britain May 21, 1936

5 Claims. (Cl. 209—466)

This invention comprises improvements in or relating to apparatus for the pneumatic separation of materials of different specific gravities, and is particularly concerned with the separation of coal from its impurities by stratification of the materials on a pervious table or deck. In such stratification the impurities stratify below the coal which occupies the major thickness of the bed, and in order to subject the coal to the maximum period of treatment it has been proposed to remove portions of this layer of impurities as the bed progresses along the table. For this purpose sieves or riddling areas in the table have been proposed. The holes in these sieves must not exceed a predetermined size which is slightly larger than the size of the particles to be removed, otherwise an excessive discharge might take place. With holes of the predetermined size however the discharge is liable to be inefficient unless the bed is subjected to an undesirably prolonged vibrating action over the sieves. In other proposals transverse slots or gaps have been provided in the table for the discharge of the bottom layer of impurities. Such arrangements are liable to the disadvantage of permitting an excessive discharge and for this purpose rotary control valves have been provided in discharge outlets below the slots or gaps. The movement of these valves however resulted in intermittent discharges causing fluctuating conditions in the bed. In other proposals a rearwardly directed skimmer projecting upwardly from the table was to direct the bottom layer into the slot while allowing the upper layer to move forwardly. Owing to the relative thinness of the bottom layer, and the fact that owing to irregular shapes the line of demarcation between the layers is ill defined, the provision of means for dividing the layers is liable to be inefficient.

The object of the present invention is to provide an improved arrangement for discharge of the lower layer which will avoid the disadvantages referred to.

According to this invention below narrow slot-like discharge openings in the table there are arranged small compartments for receiving the lower stratified layer and having apertured gates or shutters for controlling the discharge therefrom. Means are preferably provided for the admission of air to the mass of material in the compartments, whereby material therein is aerated and pneumatic pressure is able to pass through the slots to the material in the bed disposed above them. Thus uniform fluid conditions are maintained and preserved over the bed including that part disposed over the discharge slots. The gates conveniently constitute the bottom of the discharge compartments and are suitably provided with apertures formed by castellations along one of their edges. The size of the discharge apertures may be varied as for example by adjusting the position of the castellated edge of the gate or shutter in relation to a wall of the compartment. The table may be divided into a number of stratifying zones at different levels by the provision of slopes or steps disposed transversely of the table and in this case a narrow slot is preferably disposed at the forward end of each zone just before a step. The improved arrangement enables an efficient discharge of the lower layer to be effected in a restrained manner without breaking or unduly disturbing the bed. The lower layer discharges through the slot into the compartment without necessitating the provision of any means for dividing the lower from the upper layer. The discharge from this compartment takes place through the apertures in the gate. Owing to the provision of this compartment the apertures may be of a size which will readily permit the particles to escape. The sum of the areas of these apertures would approximate to that of the apertures of a sieve in the table, but each aperture would be individually larger than the permissible area of the holes in such a sieve. The number of these apertures in the compartment would of course be much less than the number of perforations in a corresponding sieve. The outlet discharge area of the receiving compartment under the slot in the table would always be slightly less than the discharge area of the slot. This is to ensure that the compartment is always full of the heavier material during working so that by this means the outlet opening of the compartment is the control on the actual quantity discharged instead of the slot. If the latter were the smaller, the compartment would empty and thereby serve no purpose in controlling the discharge of heavier material through the table. Also the provision of a compartment full of material immediately below the discharge slot restrains and steadies the flow therethrough and avoids the risk of rupturing the bed which is liable to occur if a slot alone were used. Also, to further the steadiness of flow through the slot, the latter if required to be of any substantial width, say 1" or 2" may be covered by a perforated sheet, the perforations of which may be of circular or slot form, being however of substantially greater size than would be the case where only a sieve is used as the sole means for controlling the discharge of heavier material. The provision of such perforations steadies the flow into the controlling compartment where a wide slot is used but the final control of outflow is still provided by the compartment and its discharge. The width of the slot is determined by the size of particles treated as regards its minimum and by the quantitiy approximately to be discharged in relation to the feed quantity.

In order to enable the invention to be readily understood reference will be made to the accompanying drawing illustrating by way of example, an example of construction for carrying the invention into effect, in which drawing:

Figure 1 is a central longitudinal section of a part of a table in accordance with the invention.

Figure 2 is a plan view of Figure 1,

Figure 3 is a plan view of a gate for controlling the discharge boxes of Figure 1.

Figure 4 is a plan view to a larger scale of a slotted plate shown in Figures 1 and 2.

Figure 5 is a plan view of the forward end of a modified construction of table and Figure 6 is a central longitudinal section of Figure 5.

Referring to the drawing the apparatus comprises a rectangular table $a$ of trough form with a perforated deck $b$ and upstanding sides $c$ to maintain a given thickness of bed. The deck is divided into a number of stratifying zones A B C arranged at different relative levels, each one being lower than the one preceding it. The forward end of one zone is connected with the rearward end of the next zone by an imperforate sloping portion $d$. At the forward end of each cell, just before each slope $d$, there is provided in the pervious support $l$ a narrow transverse slot 2, 2a, the edges of which are filed to a knife edge. The slots may be provided between plates 2b and the width of the slot may be varied by adjustable fixings for the plates. If desired the plates may be perforate, according to the particular condition of the coal being treated, so that some air can pass through. Below each slot 2, 2a there is disposed a hopper-like box 3 for receiving the materials discharged through the slot. The outlet from the box 3 is controlled by a swingable device comprising an arcuate plate 4 having wings 5 pivoted about an axis 6 which corresponds to the curvature of the arcuate plates. The forward edge of the latter is formed with castellations 7 providing rectangular apertures for discharge of shale from the box. In order to control the rate of discharge the effective size of the apertures may be varied. Thus the plate may be adjusted by suitable handles outside the air box so that its castellated edge co-operates with the lower edge of the wall 8 of the box. Movement of the swinging plate 4 is limited by pins 9 engaging in slots 10 therein.

Any suitable means are provided for feeding air to the dead mass of stone or shale contained in the controlled discharge boxes 3. Thus above the slot 2 (Figure 1) there may be disposed a transverse air pipe 19 fed with air under pressure from a supply pipe 18 and having a row of small depending delivery pipes 20 which project through the slot 2 into the box 3. Thus when air is fed to the pipes it will aerate the upper layers of the mass of shale or stones and enable the bed disposed above the slot to be maintained in a fluid condition corresponding to that obtaining in other parts of the bed. The air supply arrangement which would be fitted to each box, may take different forms. Thus as shown to the right of Figures 1 and 2, the air may be supplied from a pressure box 21 at one side of the table to two or more transverse pipes 22 extending through the discharge box 3 and having perforations on their underside through which the air issues into the box and then rises through the shale.

To ensure that the boxes 3 shall always be full of heavier material their discharge outlets are slightly smaller than the discharge area of the slots 2, 2a. The boxes therefore control the discharge and the material therein restrains and steadies the flow therethrough and avoids risk of rupturing the bed, as may occur if a slot alone were employed. In order to enhance the steadiness of flow through the slot, the latter may be of substantial width, for example 1" or 2" and may be covered by a sheet having circular or slot-like perforations of substantially greater size than the size of the particles to be discharged. The width of such a wide slot is determined by the size of particles treated as regards its minimum and by the quantity approximately to be discharged in relation to the feed quantity. The final control is imposed as before by the discharge outlets from the discharge boxes.

Instead of a single transverse slot plates having a number of slots may be employed for discharge of material from the lower stratum as shown to the right of Figures 1 and 2. With a slot such as 2, 2a its width would be governed by the size of the particles to be discharged. With a perforated or slotted plate 11 however, the width over which the slots extend could be much greater, the slots or perforations having approximately the same total area as a single slot. A controllable hopper discharge 3 is provided below the perforated plate as described for the slots 2, 2a. The perforations or slots 12 in such a plate could be much larger than the size of the particles to be discharged, since the discharge control is provided on the boxes, whereas in the case of sieves, they themselves exercise the controlled restraint of the discharge. A vertically adjustable blade 12a may be provided above the slopes for the purpose of damming the flow and maintaining separation of the stratified layers.

As shown in Figure 2 clean coal or the like is diverted by deflectors 13 on the skimmer 14 into side troughs or channels 15, the lower stratum passing underneath the skimmer into a central channel 16 having a second skimmer 17 at its forward end.

The table $a$ built on a chassis $f$ may be suspended by steel hangers at the four corners and is connected to any suitable vibrating mechanism to give a small throw at high periodicity. An eccentric and connecting rod may be employed, the table being slightly declined from the feed end to the discharge end to secure progression of the materials by gravitational flow. Other vibrating mechanisms can be applied as alternatives, and if they provide a component which causes forward progression of the materials, the forward declination of the table will naturally be decreased. Pneumatic pressure is applied by a fan through a duct and pulsator to an air box below the deck. A flexible connection is provided between the table and the air box. Dust hooding may be provided over the table, any suitable means being employed for separating or settling the dust. The manner of supplying the pneumatic pressure is described and shown in patent specifications No. 1,843,405, 1,730,947 and 1,811,026.

In operation, the raw materials such as coal fed to the table flows in the manner of a liquid, under the influence of vibration and pneumatic pressure, the shale or the like gradually stratifying at the bottom of the bed. At the end of the first zone A, a certain amount of stratified shale has collected at the bottom of the bed, and this is discharged into the discharge box 3. The partially cleaned coal or the like flows down the imperforate slope d and is subjected to further stratifying action in the next zone B, further shale or stone being discharged through the slot 2 into the next discharge box. The treatment proceeds similarly in the next zone.

By dividing the deck into several zones or compartments with imperforate slopes between them, the table is divided into a number of stratifying areas of a size predetermined so as not to be too large for proper control of the conditions, and before any irregularity is able to occur treatment in one zone is completed and the bed reforms for further treatment in the next zone. There is thus a deliberate and controlled discontinuity between each stratifying zone. At the same time, the coal is subjected to the desired prolonged period of treatment, and the shale is discharged without in any way disturbing the conditions in the bed.

The shale or the like discharged from the discharge boxes 3 falls through the air box and is discharged from hoppers in the bottom of the box beneath the boxes.

According to the modified arrangement shown in Figures 5 and 6, the shale and middlings are separated at the end of the central trough or channel 25 by the adjustable skimmer or cutter 26. The middlings pass over the skimmer to a chute 23 and the shale passes beneath to another chute 24. The two chutes 23, 24 are in line with the central channel 21 just beyond the air box.

In normal circumstances, the sides of the table are parallel and of constant width, but under some conditions it may be found desirable slightly to vary the widths of the cells. The purpose of this is to accommodate variations in the rate of flow of materials, which sometimes is liable to occur with fine material of the kind in question, and may be caused partly by the removal of shale. Variations in width, however, are only slight, and may be suitably provided for by fitting strips or distance pieces to the insides of the walls of any particular section. Such variations in the widths of the cells are not for the purpose of varying the thickness of the bed but for the purpose of maintaining it at uniform thickness when a tendency to thinning might otherwise occur, due to an increased rate of flow at one portion.

It will be seen that the whole object is to make practically the whole length of table available for cleaning the coal, while at the same time extracting the shale progressively as it becomes stratified, and without in any way interfering with the conditions of stratification. The controlled slot or perforate discharges do not cause any tendency for the air pressure to be violent at these points, because the discharge is restrained and the stratified shale lies in a heavy bed upon them and prevents any such free flow of air. Also, when working under the static pressure condition, the size of discharge slots or perforations has very little effect, because the quantity of air flowing is negligible.

The improved tables are of particular advantage in carrying out the static pressure process of separation already referred to. They may be operated singly or in multiple or pairs. Two or more tables may be arranged side by side on one frame or chassis and provided with a common air box or chamber or separate air chambers or each of several separating units may comprise multiple tables side by side, for example in the manner described in the patent to George Raw, No. 2,100,670. One fan may be used to serve several tables or to serve several units each comprising several tables, connection between the fan and the air boxes or chambers being by branched pipes or otherwise and the pulsators of the several tables being set so as to give sequential pulsations through the several air boxes or chambers, where necessary, to preserve uniform load on the fan (cf. patent specification Serial No. 643,258). In the case of tables placed in multiple side by side on a single chassis, the invention provides the advantage that all the less-dense materials are discharged at the forward end of the chassis and no side discharges are necessary. This enables the two or more tables or decks to be built adjacently and close together and only a partition or a single side wall need be used to divide one deck from another. As large a table as desired, within mechanical limits, can thus be built without departing from the best size of individually operating deck. The size of the tables can be increased as desired in practice, without the usual difficulty experienced in experimental development, that different dimensions do not proportionately increase.

The invention has been found of particular advantage in the treatment of fine coal, particularly below ⅛" or 1/16" in size, which has always been found the most difficult material to treat on pneumatic dry cleaning tables.

I claim:

1. Apparatus for the separation of materials of different specific gravities by stratification of the materials under the influence of static pneumatic pressure, comprising an air box; a table disposed over said air box and having a plurality of successive flat, perforated stratifying zones arranged at successively lower levels, the farther they are away from the feed end of the apparatus, and having a plurality of impervious slopes extending transversely of the table and connecting the successive stratification zones together; means for supplying and maintaining a bed of material of substantially even thickness and of uniform air flow resistance on said zones; means for supplying air to said air box at the pressure required to maintain the bed of material on the level, perforated portions of the table in statically balanced fluid condition; said table having apertures for the discharge of the lower stratified layer disposed transversely of the table at the forward end of each zone; discharge regulating boxes depending from the table below said apertures for receiving material passing through said apertures; delivery means for controllably discharging material continuously from the lower parts of said discharge boxes into the air box; said delivery means being provided with delivery openings which are larger than the largest particles of said lower stratified layer but have an area slightly less than the area of said apertures so that the said boxes will be maintained constantly full of material and the discharge therefrom will take place in a restrained manner; and means, separate from the first mentioned air supply means, for supplying air to said discharge boxes at the pressure required to maintain the depth of material in said boxes and in the bed over the boxes in balanced fluid condition to maintain stratification conditions while discharge of the heavy lower layer of material takes place.

2. Apparatus for the separation of materials of different specific gravities by stratification of the materials under the influence of static pneumatic pressure, comprising an air box; a table disposed over said air box and having a plurality of successive flat, perforated stratifying zones arranged at successively lower levels, the farther they are away from the feed end of the apparatus, and having a plurality of impervious slopes disposed at intervals transversely of the table and connecting the successive stratification zones together; means for supplying and maintaining a bed of material of substantially even thickness and of uniform air flow resistance on said zones; blades disposed over the slopes at approximately the same inclination for preserving in the next zone the stratification obtained in the previous zone, means for supplying air to said air box at the pressure required to maintain the bed of material on the level, perforated portions of the table in statically balanced fluid condition; said table having apertures for the discharge of the lower stratified layer disposed transversely of the table at the forward end of each zone; discharge regulating boxes depending from the table below said apertures for receiving material passing through said apertures, blades disposed over said apertures for damming the flow of materials over the table; controllable delivery means for discharging material continuously from the lower parts of said discharge boxes into the air box; said delivery means being provided with delivery openings which are larger than the largest particles of said lower stratified layer but have an area slightly less than the area of said apertures so that the said boxes will be maintained constantly full of material and the discharge therefrom will take place in a restrained manner; and means, separate from the first mentioned air supply means, for supplying air to said discharge boxes at the pressure required to maintain the depth of material in said boxes and in the bed over the boxes in balanced fluid condition to maintain stratification conditions while discharge of the heavy lower layer of material takes place.

3. Apparatus for the separation of materials of different specific gravities by stratification of the materials under the influence of pneumatic pressure, comprising an air box, a reciprocating table having a plurality of imperforate slopes disposed at intervals transversely of the table, a plurality of flat-bottomed stratifying zones between said slopes, and disposed at successively lower levels the farther they are from the feed end of the table and means for maintaining a bed of materials of substantially even thickness on said zones, said table having apertures for discharge of the lower stratified layer disposed transversely of the table at the forward end of each zone, discharge boxes mounted on the reciprocating table below said apertures for receiving material discharged therethrough, swingable gates having castellated edges cooperating with the walls of said boxes for discharging material from the boxes into the air box in a restrained manner and co-ordinated with the apertures in the table for maintaining the boxes full of material, and means for the admission of pneumatic pressure to the material in said boxes.

4. Apparatus for the separation of materials of different specific gravities by stratification of the materials under the influence of static pneumatic pressure, comprising an air box, a reciprocating table having a flat pervious bottom disposed over said air box, means for supplying a continuous uniform layer of materials to be separated on said table, means for supplying air to said box at sufficient pressure to maintain the bed of material in a statically balanced fluid condition; said table having a slot for discharging the lower stratified layer of materials, a discharge box mounted on said table below said slot for receiving material discharged therethrough, means for supplying air to said box at a pressure sufficient to maintain static pressure stratification conditions in the bed of material, delivery means for continuously discharging material from the lower portion of the discharge box into the air box in a restrained manner, said delivery means having an opening which is larger than the largest particles in the lower layer but has a slightly smaller area than said slot so that the box will be maintained constantly full of material and discharge will take place in a restrained manner; and means separate from the first mentioned air supply means for continuously supplying air to said box at sufficient pressure to balance the material in and above said box to maintain static pressure stratification conditions in the material in and above said box.

5. Apparatus for the separation of materials of different specific gravities by stratification of the materials under the influence of static pneumatic pressure, comprising an air box, a reciprocating table having a flat pervious bottom disposed over said air box and provided with a slot for discharge of the lower stratified layer of materials, means for maintaining a bed of materials of substantially even thickness and uniform air-flow resistance on said table, means for supplying air to said air box at a pressure sufficient to maintain the bed of material in statically balanced condition, a discharge box mounted on said reciprocating table below said slot for receiving material discharged therethrough, delivery means operative for controllably discharging continuously from the lower portion of the discharge box into the air box, said delivery means providing delivery opening which is larger than the largest particles of said lower stratified layer but has an area slightly less than the area of said slot so that the said box shall be maintained constantly full of material, and discharge shall take place therefrom in a restrained manner, and a further air supply having delivery pipes extending to the discharge box for the supply of pneumatic pressure to the material therein to balance the material and maintain static pressure stratification conditions in the material in the box and in the bed over the box.

FRANK FROST RIDLEY.